Patented Aug. 16, 1927.

1,639,152

UNITED STATES PATENT OFFICE.

ORLAND RUSSELL SWEENEY, OF AMES, IOWA.

PROCESS OF ELABORATING CORN STALKS INTO PULP FOR USE IN PAPER MAKING AND THE LIKE.

No Drawing.      Application filed November 15, 1926.   Serial No. 148,615.

The object of my invention is to provide a process for reducing corn stalks into a pulp suitable for use in the manufacture of paper, lumber substitute, wall board and the like, which process may be practiced with the use of simple and inexpensive apparatus, which may be readily and easily obtained in any locality, and with a minimum use of heat or the chemicals customarily used in pulp making.

My invention consists in the method of preparing the material and the successive steps for elaborating it into pulp suitable for the manufacture of paper, lumber substitute, wall board, insulating material and the like, and whereby the objects contemplated are attained, as hereinafter more fully set forth and pointed out in my claim.

In the practice of my improved method I first provide a suitable tank or receptacle and place therein shredded corn stalks, and then place water in the tank or receptacle to wholly or partially submerge the corn stalks. Under these conditions, I have demonstrated that certain naturally occuring micro-organisms will attack the corn stalks and that the corn stalks will be partially disintegrated by the action of these molds, yeast and bacteria, any one or all three of them, which will always be present under the named conditions. The corn stalks are allowed to ferment under such conditions for a period of two days or longer, during which time the action of the micro-organisms or the enzymes secreted by them will separate the non-fibrous or ligneous tissues of the corn stalks and the cellulosic fibers thereof will not be substantially effected or disintegrated.

During the action just described, it is not necessary to take any action to stop the fermentation process, because after the fermentation process has proceeded to the proper degree necessary for the separation of the fibrous parts of the stalks, the fermentation will practically cease.

During the period of fermentation I have found that the time necessary for its completion may be shortened by applying heat to the mass at a temperature well below the boiling point. This, however, is not essential.

After the fermentation has ceased, or has proceeded to the extent necessary for the separation of the fibers, the mass is then subjected to the action of a mechanical beater of the kind ordinarily used in the preparation of pulp for paper making, and after beating the mass it is then in condition for manufacture into such materials as lumber substitute and wall board, and these materials may be produced from the pulp thus made in the usual manner in which lumber substitutes and wall board are now ordinarily made.

I have found that the lumber substitute or wall board thus produced has a minimum tendency to warp during the process of drying, and that it has high value as a heat insulator.

From the foregoing it will be observed that by the use of my improved process, wall board, lumber substitute and the like may be produced with a minimum amount of simple and inexpensive apparatus, without chemicals and without the application of heat.

I have also demonstrated that if it is desired to speed up the action of disintegration, the fermented corn stalks and water may be cooked in an auto-clave either alone or in the presence of the usual chemicals used in paper making, such for instance as soda, lime, sulphite and the like, and thereby causing a more complete disintegration of the mass of corn stalks in less time than is required without the cooking and chemicals.

I have also demonstrated that by giving the corn stalks a preliminary cooking, and then placing them in a vat or pile, the micro-organisms before described will act upon it and reduce it to a proper condition to be introduced into a beater for pulp making.

I may prefer to treat the corn stalks in the manner before described, and then add to them certain material such as pulped newspaper or wood fibre or mechanically ground, undigested, uncooked corn stalks or a suitable size material.

I claim as my invention:

The method of elaborating corn stalks into a pulp for the manufacture of paper, lumber substitute, wall board and the like, which method consists in cooking corn stalks in the presence of soda, lime, sulphite or the like, subjecting the mass to the action of micro-organisms to thereby create a condition under which the corn stalks will be partially disintegrated by the molds, yeast and bacteria which occur under such conditions, and finally subjecting the mass to the action of a mechanical beater.

ORLAND RUSSELL SWEENEY.